US009109124B2

(12) United States Patent
Carlini et al.

(10) Patent No.: US 9,109,124 B2
(45) Date of Patent: Aug. 18, 2015

(54) SOLID INK COMPOSITIONS COMPRISING SEMICRYSTALLINE OLIGOMER RESINS

(75) Inventors: Rina Carlini, Oakville (CA); Adela Goredema, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 608 days.

(21) Appl. No.: 13/432,549

(22) Filed: Mar. 28, 2012

(65) Prior Publication Data

US 2012/0309896 A1 Dec. 6, 2012

Related U.S. Application Data

(60) Provisional application No. 61/492,292, filed on Jun. 1, 2011.

(51) Int. Cl.
| | |
|---|---|
| *B01F 17/00* | (2006.01) |
| *C08G 18/42* | (2006.01) |
| *C08G 63/60* | (2006.01) |
| *C08G 69/26* | (2006.01) |
| *C08G 69/44* | (2006.01) |
| *C08L 67/00* | (2006.01) |
| *C08L 67/02* | (2006.01) |
| *C08L 73/00* | (2006.01) |
| *C08L 77/00* | (2006.01) |
| *C08L 79/00* | (2006.01) |
| *C09D 5/00* | (2006.01) |
| *C09D 11/00* | (2014.01) |
| *C09D 11/10* | (2014.01) |
| *C09D 11/104* | (2014.01) |
| *C09D 11/102* | (2014.01) |
| *C08K 3/00* | (2006.01) |
| *C08L 77/12* | (2006.01) |
| *C08K 5/00* | (2006.01) |
| *C08L 77/06* | (2006.01) |
| *C09D 11/34* | (2014.01) |

(52) U.S. Cl.
CPC .............. *C09D 11/10* (2013.01); *C08K 3/0033* (2013.01); *C08K 5/0041* (2013.01); *C08L 67/00* (2013.01); *C08L 67/02* (2013.01); *C08L 77/00* (2013.01); *C08L 77/06* (2013.01); *C08L 77/12* (2013.01); *C08L 79/00* (2013.01); *C09D 11/102* (2013.01); *C09D 11/104* (2013.01); *C09D 11/34* (2013.01)

(58) Field of Classification Search
CPC ....... C09D 11/10; C09D 11/34; C09D 11/102; C09D 11/104; C08K 3/0033; C08K 5/0041; C08L 67/00; C08L 67/02; C08L 77/00; C08L 77/06; C08L 77/12; C08L 79/00

USPC .......... 523/160, 161; 524/599, 601, 602, 604, 524/606
See application file for complete search history.

(56) References Cited

U.S. PATENT DOCUMENTS

| | | |
|---|---|---|
| 5,195,430 A | 3/1993 | Rise |
| 5,231,135 A | 7/1993 | Machell |
| 5,389,958 A | 2/1995 | Bui |
| 5,621,022 A | 4/1997 | Jaeger |
| 5,782,966 A | 7/1998 | Bui |
| 6,221,137 B1 | 4/2001 | King |
| 6,309,453 B1 | 10/2001 | Banning |
| 6,472,523 B1 | 10/2002 | Banning |
| 6,476,219 B1 | 11/2002 | Duff |
| 6,576,747 B1 | 6/2003 | Carlini |
| 6,576,748 B1 | 6/2003 | Carlini |
| 6,590,082 B1 | 7/2003 | Banning |
| 6,646,111 B1 | 11/2003 | Carlini |
| 6,663,703 B1 | 12/2003 | Wu |
| 6,673,139 B1 | 1/2004 | Wu |
| 6,696,552 B2 | 2/2004 | Mayo |
| 6,713,614 B2 | 3/2004 | Carlini |
| 6,726,755 B2 | 4/2004 | Titterington |
| 6,755,902 B2 | 6/2004 | Banning |
| 6,821,327 B2 | 11/2004 | Jaeger |
| 6,958,406 B2 | 10/2005 | Banning |
| 6,998,493 B2 | 2/2006 | Banning |
| 7,053,227 B2 | 5/2006 | Jaeger |
| 7,186,762 B2 | 3/2007 | Wong |
| 7,211,131 B2 | 5/2007 | Banning |
| 7,294,730 B2 | 11/2007 | Banning |
| 7,381,831 B1 | 6/2008 | Banning |
| 7,427,323 B1 | 9/2008 | Birau |
| 7,465,348 B1 | 12/2008 | Carlini |
| 7,503,973 B1 | 3/2009 | Carlini |
| 7,560,587 B2 | 7/2009 | Goredema |
| 7,732,581 B2 | 6/2010 | Banning |
| 7,905,954 B2 | 3/2011 | Carlini |
| 2009/0046134 A1* | 2/2009 | Belelie et al. ................. 347/102 |
| 2010/0086683 A1 | 4/2010 | Birau |
| 2012/0128881 A1* | 5/2012 | Faucher et al. ............... 427/256 |

OTHER PUBLICATIONS

Odian, G., Principles of Polymerization, Fourth Edition, 2004, pp. 1-38.*
U.S. Appl. No. 13/095,221, filed on Apr. 27, 2011.
U.S. Appl. No. 13/196,227, filed Aug. 2, 2011.

* cited by examiner

*Primary Examiner* — Patrick Niland
(74) *Attorney, Agent, or Firm* — Pillsbury Winthrop Shaw Pittman LLP

(57) ABSTRACT

A solid ink composition comprising oligomer resins which are suitable for direct-to-paper (DTP) and/or transfix inkjet printing. In embodiments, the oligomer resins are poly/oligoester and poly/oligoesteramide compounds, which are non-wax materials having semi-crystalline properties.

14 Claims, 3 Drawing Sheets

SOLID INK COMPOSITIONS COMPRISING SEMICRYSTALLINE OLIGOMER RESINS

RELATED APPLICATIONS

This application is a non-provisional application claiming priority to U.S. Provisional Application Ser. No. 61/492,292, filed Jun. 1, 2011, which is expressly incorporated by reference.

BACKGROUND

The solid ink compositions disclosed herein are characterized by being solid at room temperature and molten at an elevated temperature at which the molten ink is applied to a substrate. These solid ink compositions are useful for printing inks, in particular for ink jet printing inks.

Solid ink compositions used for ink jet printing typically contain both a colorant and vehicle or carrier, where the vehicle or carrier is a material that dissolves or suspends the colorant. For example, a simple solid ink composition is composed of wax as the carrier and a pigment or dye as the colorant. Many solid ink compositions are mainly comprised of crystalline polyethylene waxes and other functionalized wax components, which allow rapid phase transitions from the molten liquid state to the solid state, and due to their low coefficient of friction, are also helpful with automated feeding of printed documents across the printer's glass platen and other subsystems. Solid ink compositions have also generally included resins as components of inks. Resins allow the ink to be sufficiently tough after cooling so that the ink is more resistant to mechanical loads on the printed substrate, such as tackiness, scratch and fold creases. Additionally, the use of resins in ink compositions has the advantage that dyes can be dissolved relatively well therein and pigments can be dispersed relatively easily therein. Resins also have the advantage that their chemical compositions can be modified readily to provide either amorphous, semi-crystalline or purely crystalline physical characteristics which contribute to solidification of the ink.

Many traditional solid ink compositions are made from highly crystalline waxes or wax-based materials, such as polyethylene waxes, and hydrocarbon amide or ester waxes, which are very hard and resistant materials that undergo rapid melting and rapid crystallization (solidification) upon cooling; however, these wax-based crystalline solid inks do experience certain physical disadvantages. For example, solid inks comprised of hard, crystalline wax-based materials are also much more brittle, so that printed matter made using such inks can be sensitive to damage by applied mechanical forces, such as for examples, scratches or cracks from page creases. In addition, crystalline wax-based solid inks generally have poor adhesion to non-porous substrates, which lends itself to poor scratch-resistance and image robustness. The highly non-polar nature of hydrocarbon waxes, such as crystalline polyethylene waxes, also can limit the solubility and miscibility of common ink components and special performance additives, such as colorants, dispersants, synergists, rheology modifiers, and antioxidants, which can result in one having to develop custom additives and materials for such inks.

As such, there is a need for alternative solid ink compositions that are not based on highly crystalline polymeric waxes that can provide durable, more robust solid ink prints without the above-described issues. There is also a need for alternative solid ink compositions that are comprised of higher polarity resins having a certain degree of both crystalline and amorphous characteristics (e.g., they have semi-crystalline properties) which would provide more viscoelasticity in the solid ink and greater compatibility with common ink additives and colorants. There is also an increasing demand for sustainable inks comprised of bio-sourced resins and components, and which may have more biodegradable functionality, compared with the commercial hydrocarbon wax-based inks.

SUMMARY

According to embodiments illustrated herein, there is provided novel solid ink compositions comprising semi-crystalline oligomer resins, such as oligoesteramide, oligoester and oligoamide resins suitable for inkjet printing technology.

In particular, the present embodiments provide a solid phase change ink comprising: a semi-crystalline oligomer resin selected from the group consisting of a polyester, an oligoester, a polyesteramide and oligoesteramide; an optional colorant; and an ink vehicle, wherein the semi-crystalline oligomer resin is made from a condensation reaction of a dicarboxylic acid or anhydride or diester, a difunctional alkanol monomer, and an optional monofunctional end-capping reactant.

In further embodiments, there is provided a solid phase change ink comprising: a semi-crystalline oligomer resin selected from the group consisting of a polyester, an oligoester, a polyesteramide and oligoesteramide; a colorant; and an ink vehicle, wherein the oligomer resin is made from the condensation reactions of a dicarboxylic acid, a difunctional alkanol monomer, and an optional monofunctional end-capping reactant, represented by the following reaction:

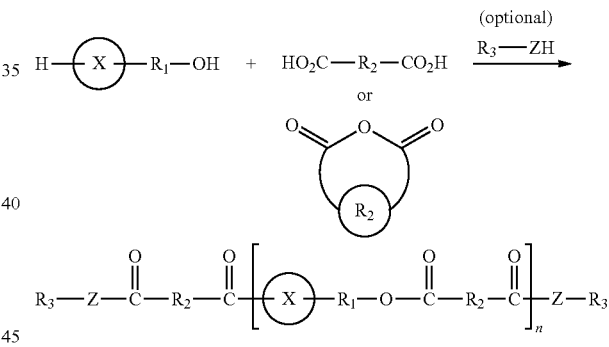

wherein X=O, NH, and mixtures thereof, and group Z=O or NH in the optional end-capping agent $R_3ZH$. $R_1$, $R_2$, and $R_3$ are independent from one another and may be substituted or unsubstituted and hetero atoms either may or may not be present and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10.

In yet other embodiments, there is provided a solid phase change ink comprising: a semi-crystalline oligoesteramide or oligoester resin; a colorant; and an ink vehicle, wherein the oligoesteramide resin has the following formula

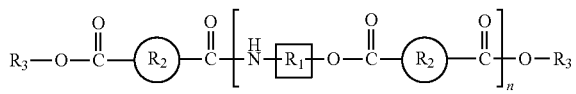

wherein $R_1$, $R_2$, and $R_3$ are independent from one another and may be substituted or unsubstituted and hetero atoms either may or may not be present and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10, and the oligoester resin has the following formula

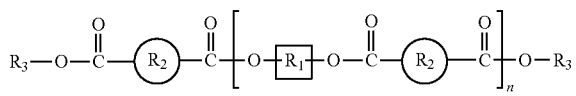

wherein $R_1$, $R_2$, and $R_3$ are independent from one another and may be substituted or unsubstituted and hetero atoms either may or may not be present and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10.

BRIEF DESCRIPTION OF THE DRAWINGS

For a better understanding of the present embodiments, reference may be made to the accompanying figures.

DETAILED DESCRIPTION

Figure 1:
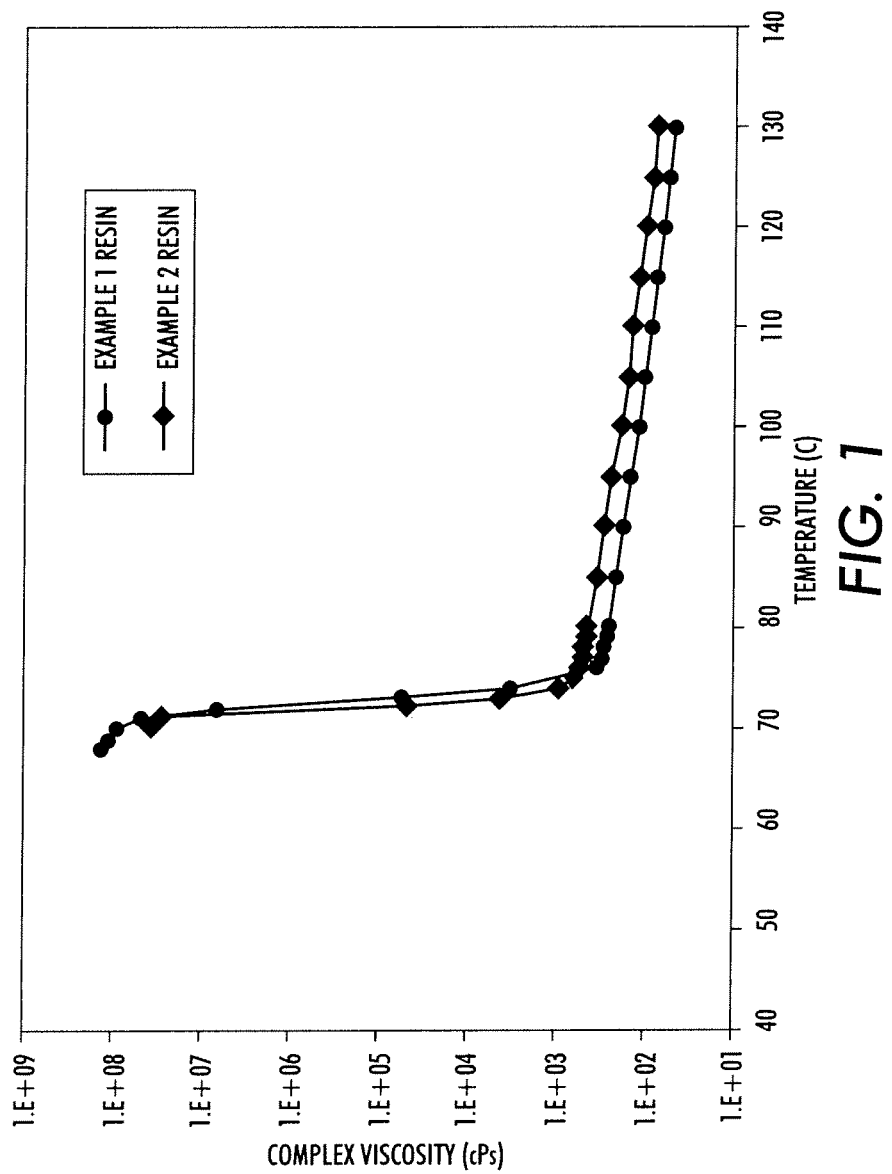
FIG. 1 is a graph illustrating rheological profiles (complex viscosity versus temperature) for the semicrystalline oligomer resins according to the present embodiments.

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid at room temperature and molten at an elevated temperature at which the molten ink is applied to a substrate. Current commercial solid ink printers typically utilize highly crystalline hydrocarbon wax-based solid inks. The waxes function in the ink as both the phase-change agent, to allow for sharp melting and rapid crystallization of the ink, as well as the vehicle or carrier of the molten ink that binds together the other ink components. As discussed earlier, however, while waxes provide certain jettability and image quality benefits to inks, wax-based inks also suffer from several problems including brittleness, which can lead to poor scratch resistance and enhanced paper creases, and poor adhesion to non-porous paper and substrates, which can further exacerbate the issues with image robustness.

The present embodiments relate to novel solid ink compositions comprising semicrystalline oligomer resins, such as oligoesteramides or oligoesters, and mixtures thereof, which have suitable properties for direct-to-paper (DTP) and/or transfix inkjet printing. In embodiments, the semicrystalline oligomer resins comprise oligoesteramide compounds that are made from linear amino-alkanols and dicarboxylic acids, which are non-wax-based materials, and which have semicrystalline properties. These semi-crystalline oligomer materials have exhibited sharp crystallization phase-transition from liquid (melt) state to solid state at a temperature ranging from about 50° C. to about 100° C., or from about 60° C. to about 90° C., which is suitable for a hot-melt, phase change inkjet ink. The semi-crystalline oligomer resins of this disclosure additionally possess amorphous characteristics, more specifically a glass transition (Tg) temperature range that will provide a certain degree of viscoelasticity to the ink compositions, which can diminish ink brittleness and enhance abrasion-resistance. In embodiments, the semi-crystalline oligomer compounds have exhibited the onset Tg temperature range of from about −10° C. to about 50° C., or from about −5° C. to about 40° C. Furthermore, the present embodiments provide "green" sustainable inks comprising the semi-crystalline oligomers prepared from bio-sourced monomers as starting materials.

Additionally, ester and certain amide functional groups present in poly-/oligoesters and poly-/oligoesteramides are known by literature reports to have good biodegradability profiles, as discussed in Bettinger et al., Amino Alcohol-based Degradable Poly(ester amide) Elastomers, Biomaterials 29 (2008) 2315-2325; Montané et al., Comparative Degradation Data of Polyesters and Related Poly(ester amide)s Derived from 1,4-Butanediol, Sebacic Acid, and α-Amino Acids, Journal of Applied Polymer Science 85 (2002) 1815-1824; Armelin et al., Study on the Degradability of Poly(ester amide)s Derived from the α-Amino Acids Glycine, and L-Alanine Containing a Variable Amide/Ester Ratio, Polymer 42 (2001) 7923-7932; and Qian et al., Hydrolytic Degradation Study of Biodegradable Polyesteramide Copolymers Based on ε-Caprolactone and 11-Aminoundecanoic Acid, Biomaterials 25 (2004) 1975-1981. Thus poly-/oligoesters and poly-/oligoesteramides can be used to provide "green"

sustainable solid inkjet ink compositions. For example, such materials can be degraded by biological activity, especially by enzymatic action, leading to a significant change in the chemical structure of the material such that it will break down into mostly water, carbon dioxide and small molecular organic matter.

The semicrystalline oligomer resins also act as a binder material that can provide good adhesion to substrates including paper and other non-porous materials, and binds together the other components in the ink composition, such as for example, an optional crystalline phase-change agent, a colorant, optional viscosity modifier and other additives such as an antioxidant, to ensure good jettability performance. The present embodiments provide solid inks with several advantageous properties, including, melting temperatures of 80° C. or higher, such as for example, from about 80° C. to about 130° C., or from about 90° C. to about 120° C., temperatures for ink crystallization ranging from about 50° C. to about 100° C. or from about 60 to about 90, and a large viscosity change (e.g., greater than $10^5$ cPs or from about 10 cPs to about $10^6$ cPs, during the ink crystallization (solidification) phase transition over a temperature range of only from about 5° C. to about 20° C. or from about 7° C. to about 15° C., or from about 8° C. to about 13° C.). Thus, the present oligomer resins, which can be oligoester or oligoesteramide compounds or mixtures thereof and which provide semicrystalline components for the solid inks, can provide to jettable solid inks having desirable rheological profiles and that meet the requirements for inkjet printing.

A general synthesis scheme for preparation of the semicrystalline oligomer resins, such as oligoester and oligoesteramide compounds of the present embodiments, is shown below:

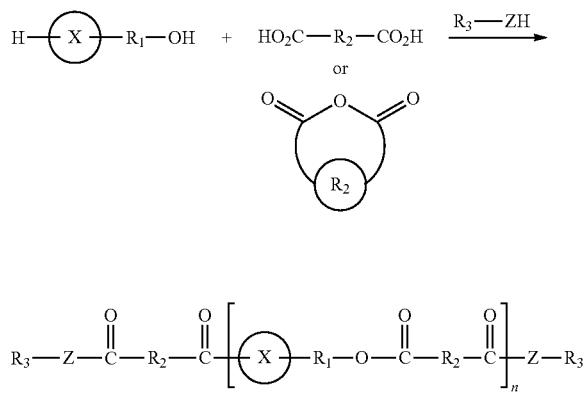

As shown above, a dicarboxylic acid is reacted with a difunctional alkanol monomer such as an alkanediol when X=O, or an amino-alkanol when X=NH, and mixtures thereof, in the presence of an optional end-capping agent represented by $R_3$—ZH which can be a mono-alcohol $R_3$—OH when Z=O, or a mono-amine $R_3$—$NH_2$ when Z=NH. $R_1$, $R_2$, and $R_3$ are independent from one another and may be substituted or unsubstituted and hetero atoms either may or may not be present and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10.

In embodiments, the semi-crystalline oligomer resins may be made from a variety of alkanedicarboxylic acids which can be either linear, branched or cyclic, and also aromatic and heteroaromatic dicarboxylic acids, wherein the aromatic groups may have additional alkyl group substituents having up to 6 carbons, or other functional group substituents such as halogens F, Cl, Br, I, OH, $OCH_3$, $OCH_2CH_3$, amino, COOH, COOR (where R is an alkyl group up to 10 carbons), $SO_3H$, and the like. Exemplary dicarboxylic acids include 1,12-dodecanedioic acid, 1,18-octadecanedioic acid, azelaic acid (1,9-nonanedioic acid), sebacic acid (1,8-octanedioic acid), adipic acid (1,6-hexanedioic acid), succinic acid (1,4-butanedioic acid), 1,4-cyclohexanedioic acid, 1,2-cyclohexanedioic acid, C-36 dimer acid, terephthalic acid, isophthalic acid, phthalic acid, anhydrides such as phthalic anhydride and succinic anhydride, and many others.

In embodiments, the semi-crystalline oligomer resins can be made from any suitable difunctional alkanol monomer, such as an alkanediol or amino-alkanol, wherein the alkyl portion of the monomer can be either linear, branched or cyclic. The alkanol portion may also contain aromatic and heteroaromatic groups of up to 6 carbons, which may be further substituted with groups such as halogens F, Cl, Br, I, OH, $OCH_3$, $OCH_2CH_3$, amino, COOH, COOR (where R is an alkyl group up to 10 carbons), $SO_3H$, and the like.

In embodiments, a ratio of the dicarboxylic acid to the difunctional alkanol monomer is from about 2:1 to about 0.5:1.

In the present embodiments, the semicrystalline oligomer resin is an oligoesteramide compound having the following structure:

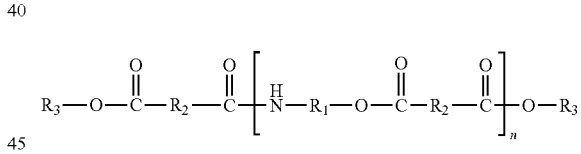

wherein $R_1$, $R_2$, and $R_3$ are independent from one another and may be substituted or unsubstituted and further wherein $R_1$ is an alkylene having from about 1 to about 20 carbons, or from about 1 to about 10 carbons such as methylene, ethylene, butylene or the like; alkyleneoxy having from about 1 to about 20 carbons, or from about 1 to about 10 carbons such as methyleneoxy, ethyleneoxy, or the like; or arylene having from about 6 to about 10 carbons such as phenylene, naphthylene, or the like; $R_2$ is an alkylene or arylene as defined above; $R_3$ is an alkyl group having from about 1 to 50 carbon atoms, or from 1 to 30 carbon atoms such as methyl, ethyl, butyl or the like; or aryl or heteroaryl having from about 6 to about 50 carbon atoms, or from 6 to 30 carbon atoms such as phenyl, naphthyl, or the like; and n is a number of from about 1 to about 10 Specific examples of oligoesteramide resins of the present disclosure are illustrated in Table 1 below.

TABLE 1

| Resin | $R_1$ | $R_2$ | $R_3$ | Viscosity @ 130° C. (Freq rate = 1 Hz) | Tcrys (° C.) from rheology |
|---|---|---|---|---|---|
| Ex. 1 | $(CH_2)_6$ | $(CH_2)_{10}$ | $CH_3-(CH_2)_{11}$ | 50 | 76 |
| Ex. 2 | $(CH_2)_6$ | $(CH_2)_{10}$ | $H_3CO$–⟨phenyl⟩–$CH_2$– | 74.5 | 75 |
| Ex. 3 | $(CH_2)_6$ | branched alkyl | $CH_3(CH_2)_n$— where n has an average of 21 | 139 cps @ 120° C. | — |
| Ex. 4 | $(CH_2)_6$ | $(CH_2)_{10}$ | $CH_3-(CH_2)_{15}$ | 26.5 | 70 |
| Ex. 5 | $(CH_2)_6$ | —⟨phenyl⟩— | $H_3CO$–⟨phenyl⟩–$CH_2$– | 50 | 76 |
| Ex. 6 | $(CH_2)_6$ | 90 mol % $(CH_2)_{10}$ and 10 mol % —⟨cyclohexyl⟩— | $CH_3-(CH_2)_{15}$ | — | — |
| *Ex. 7 | $(CH_2)_6$ | $(CH_2)_{10}$ | $CH_3-(CH_2)_{11}$ | 31 | 70 |
| Ex. 8 | $(CH_2)_6$ | $(CH_2)_{10}$ | ⟨phenyl⟩–$CH_2CH_2$– | 45 | 73 |

Example 7 was made under different reaction conditions than Example 1 (e.g., Example 7 was allowed to go for a longer period of time at higher temperature compared to Example 1; 4.5 hours at 185° C. compared to 1 hour at 180° C. for Example 1

The profiles are graphs of complex viscosity versus temperature, measured with a Rheometrics RFS3 instrument at constant frequency rate of 1 Hz under 200% applied strain using a parallel plate geometry tool.

In the present embodiments, the semicrystalline oligomer resin may also be an oligoester having the following formula

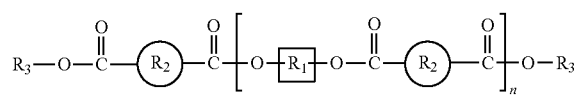

wherein $R_1$, $R_2$, and $R_3$ are independent from one another and may be substituted or unsubstituted and hetero atoms either may or may not be present and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10.

In the present embodiments, there is provided non-wax and bio-degradable semicrystalline oligomer resins, such as the oligoesteramide compounds prepared from aminoalkanols, as illustrated in the general synthesis scheme shown above, and novel phase-change ink compositions comprising these resins. The ink compositions of the present disclosure can be used in either direct-to-paper (DTP) or transfix inkjet printing processes. Specific examples of oligoester resins of the present disclosure are illustrated in Table 2 below.

TABLE 2

| Resin | $R_1$ | $R_2$ | $R_3$ | Viscosity @ 130° C. (Freq rate = 1 Hz) | Tcrys (° C.) from rheology |
|---|---|---|---|---|---|
| 1 | $(CH_2)_6$ | $(CH_2)_{10}$ | $CH_3(CH_2)_{11}$ | 12.5 | 51 |
| 2 | $(CH_2)_6$ | $(CH_2)_{10}$ | — | 16.5 | 83 |

In embodiments, the oligoesteramide resin is semi-crystalline and exhibits a sharp phase transition over a narrow temperature range of about 10-15° C. upon crystallization from the melt state. The oligomer resins produced have low molecular weights (for example, in the range of from about 500 to about 2,500 g/mol, or from about 600 to about 2000 g/mol) in order to have low enough viscosity at the desired jetting temperature that will enable jettability of the ink, yet can also function as a binder resin of the ink (as ink vehicle; that is, with greater than 50% wt of ink content) when combined with another crystalline low molecular weight phase-change agent or viscosity-modifying component. Because the resin is also semi-crystalline, its inherent phase change properties provide crystallization reinforcement of the ink.

A phase-change (solid) ink formulation was developed with an oligoesteramide resin by combining it with a viscosity modifier vehicle component that has a lower melt viscosity at the jetting temperature of from about 100° C. to about 150° C., or from about 110° C. to about 140° C. In embodiments, the viscosity modifier vehicle component is a crystalline compound, which may be selected from the group consisting of alkane urethanes, alkane diurethanes, alkylamides such as stearamide, erucamide, behenamide, stearyl stearamide, alkyl esters of monosaccharides such as sorbitol, mannitol, and derivatives such as tartaric acid, malic acid and the like, and alkyl mono-oxazoline diols, which are disclosed in U.S. patent application Ser. No. 13/095,221, filed on Apr. 27, 2011, the disclosure of which is incorporated herein, and mixtures thereof. Specific embodiments of such crystalline phase-change agents, and their properties, are shown in Table 3 below.

transition of the oligoesteramide binder resin of Example 1, and are suitable as complementary vehicle or carrier components for the disclosed ink compositions.

In embodiments, the ink vehicle further comprises other crystalline components. These components may be present in the ink vehicle in an amount of 1 to 70 wt % of the ink. In embodiments, where the vehicle component is a crystalline compound (which is optional and may be preferable in certain compositions), then the component has a crystallization temperature that lies within ±10° C. to ±15° C. of the crystallization temperature of the selected semi-crystalline oligomer resin. The optional crystalline ink vehicle component that is selected should have lower viscosity at the desired jetting temperature than that of the semicrystalline oligomer resin at the jetting temperature. More preferably, the optional crystalline ink vehicle component should have a viscosity which does not exceed the viscosity of the final inkjet ink composition, so as to ensure suitable viscosities for good jetting performance. Relative amounts of the semicrystalline oligomer binder resin and the optional crystalline ink component, the latter which has lower viscosity, should be such that the final viscosity of the ink vehicle is in the range of from about 9 to about 14 cPs, or from about 9.5 cPs to about 13 cPs, or from about 10 cPs to about 12 cPs, and the ink crystallization

TABLE 3

| | Crystalline phase-change component | Tmelt (DSC), °C. | Tcrys (DSC), °C. | T crys (rheology), °C. |
|---|---|---|---|---|
| 1 | 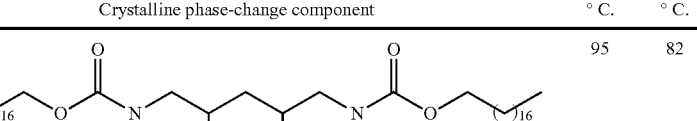 | 95 | 82 | 90 |
| 2 | 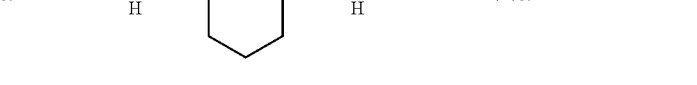 | 97 | 73 | 88 |
| 3 | 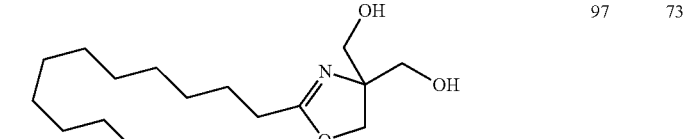 | 95 | 76 | 88 |

Compound 1 of Table 3 is a crystalline di-urethane compound disclosed in U.S. Pat. No. 7,560,587, which is hereby incorporated by reference in its entirety. Compound 2 of Table 3 is C-11 alkylated mono-oxazoline diol, another crystalline compound disclosed in U.S. patent application Ser. No. 13/095,221. Compound 3 is a crystalline di-ester disclosed in U.S. patent application Ser. No. 13/196,227, filed Aug. 2, 2011 to Goredema et al.

Figure 2:
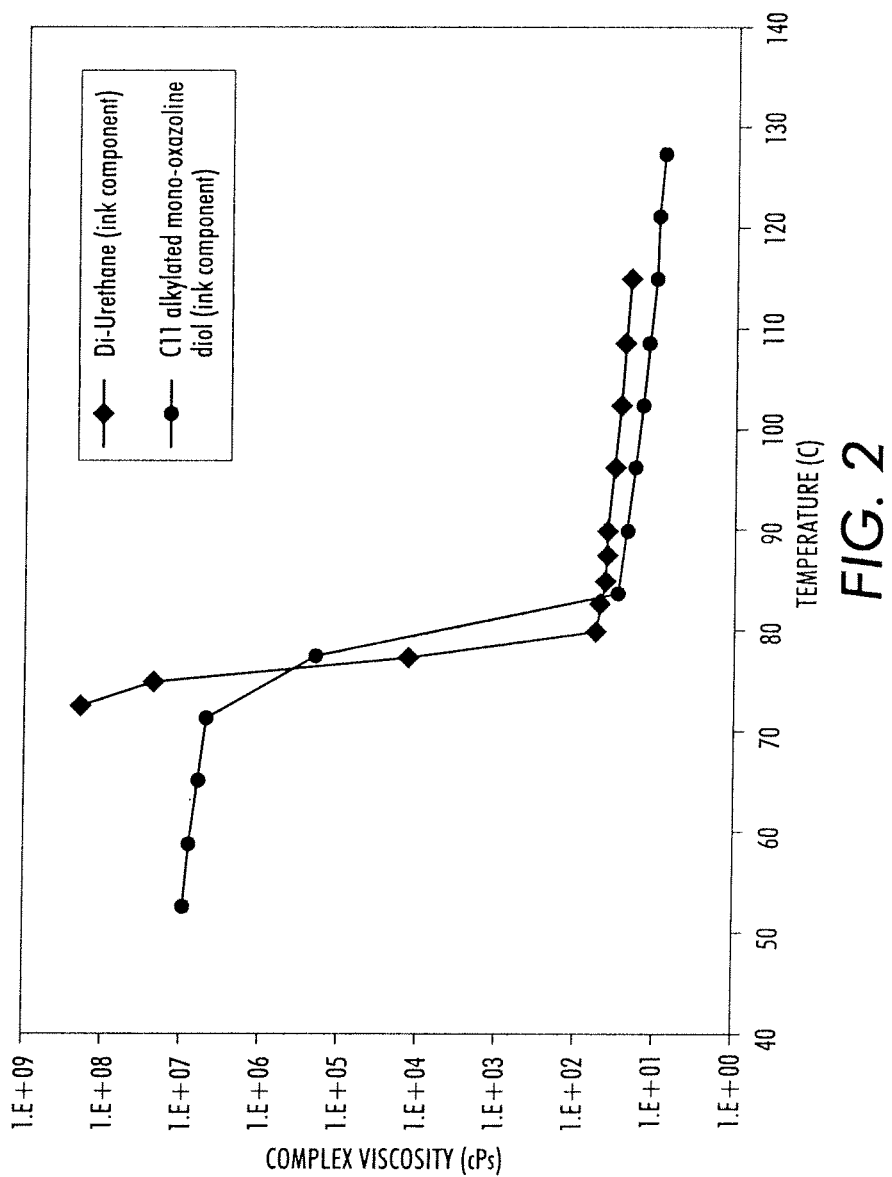
FIG. 2 is a graph illustrating rheological profiles (complex viscosity versus temperature) for the phase change ink components present within the ink vehicle, a di-urethane and C11-alkylated mono-oxazoline diol, used with the present embodiments.

FIG. 2 provides complex viscosity-temperature profiles for the phase-change ink components of Table 3, exhibiting crystallization transitions at (i) from about 90° C. to about 92° C. for di-urethane (compound 1 of Table 3), and at (ii) 88° C. for C11-alkylated mono-oxazoline diol (compound 2 of Table 3). These compounds are compatible and readily blend with the oligoesteramide resin of Example 1, and have crystallization transitions that are within close range to the semi-crystalline temperature is in the range of from about 55° C. to about 105° C., or from about 60° C. to about 100° C., or from about 65° C. to about 95° C. In embodiments, ratios to achieve these ink properties would be from about 10 to about 90 wt %, or from about 10 to about 70 wt %, or from about 15 to about 60 wt %, of the semi-crystalline oligomer binder resin, with about 10 to about 70 wt %, or from about 20 to about 60 wt %, of the optional crystalline vehicle component, in the ink composition. Additionally, in the present embodiments, the consistency of the ink should have one uniform phase throughout, without an apparent density gradient of components or visible domains of phase-separated crystallites.

The colorant selected for the solid ink compositions of the present embodiments could be a dye or pigment, and should have good compatibility with the ink components. While the amount of colorant used in the ink will depend on the spectral strength of the selected colorant, typical ranges for the dye or pigment can be from about 1 to about 5 wt % of the ink composition. Additional additives in the ink, such as for example, antioxidants, are used in typical amounts for such formulations—normally added at less than about 1 wt % of the ink composition.

Table 4 below provides several ink formulations of the present embodiments.

TABLE 4

| | Relative Parts (% wt) | | | | |
|---|---|---|---|---|---|
| | Ink Example 1 | Ink Example 2 | Ink Example 3 | Ink Example 4 | Ink Example 5 |
| Phase Change Component | | | | | |
| MonoOxazoline Diol (Example 2 Table 3) | 64.0 | 32.0 | 57.5 | | |
| Diurethane (Example 1 Table 3) | | 21.5 | 8.0 | | |
| Diester (Example 3 Table 3) | | | | | 11.5 |
| Semi-crystalline Binder Resin Component | | | | | |
| Oligoesteramide resin (example 1 Table 1) | 16.0 | 36.5 | | | |
| Oligoesteramide resin (Example 2 Table 1) | 12.3 | | | | |
| Oligoesteramide resin (Example 3 Table 1) | | | 23.5 | | |
| Oligoesteramide resin (Example 7 Table 1) | | | | 77.5 | |
| Oligoester Resin (Example 2 Table 2) | | | | | 86 |
| Colorant | | | | | |
| Orasol ™ Blue GN (Commercial Copper Phthalocyanine dye) | 3.0 | 3.0 | 3.0 | 2.5 | 2.5 |
| Other Additives | | | | | |
| Naugard ™ 445 (Antioxidant) | 0.2 | 0.2 | 0.2 | | |
| Stearone (Viscosity Modifier) | | | | | |
| Penta-erythritol tetra-stearate (Viscosity Modifier) | | | 3.3 | 5.0 | |
| Kemamide S180 Stearyl Stearamide (Viscosity Modifier) | 4.5 | | 2.8 | 20 | |
| Erucamide (Viscosity Modifier) | | 3.5 | | | |
| Total (% wt) | 100.0 | 100.0 | 100.0 | 100 | 100 |

As an example, Ink Example 1 is a phase-change solid ink comprising two specific oligo-esteramide resin of the present embodiments, namely, Example 1 resin and Example 2 resin, in amounts of 16.0 and 12.3 wt % of the ink composition. The lower viscosity vehicle component that was selected is a crystalline phase-change compound that is an eleven carbon alkyl substituted—mono-oxazoline diol, which is disclosed in U.S. patent application Ser. No. 13/095,221 and is hereby incorporated as a reference in its entirety. This mono-oxazoline compound was added at about 64 wt % of the ink. A viscosity modifier, S-180 (also known commercially as Kemamide, or, stearyl stearamide), was added at about 4.5 wt % as a rheology modifier to provide a suitable jetting viscosity at 130° C. The commercial colorant selected was Orasol™ Blue GN (a copper-phthalocyanine dye) from Ciba Geigy, which was added at 3 wt % of the ink. Lastly, a commercial antioxidant, Naugard™ 445, was added at a fractional amount of 0.2 wt % of the ink. The ink components were added together in the order indicated above, and melt-mixed at 130° C. for at least 1 hour before pouring into a mold and cooled to form a solid ink. The viscosity of the final ink was 12.5 cPs at 130° C., with an on-set of crystallization at (determined by rheology at frequency rate=1 Hz) at 82° C. and a narrow liquid-to-solid phase transition that spanned from about 85° C. to about 75° C. (approximately a 10° C. range).

Figure 3:
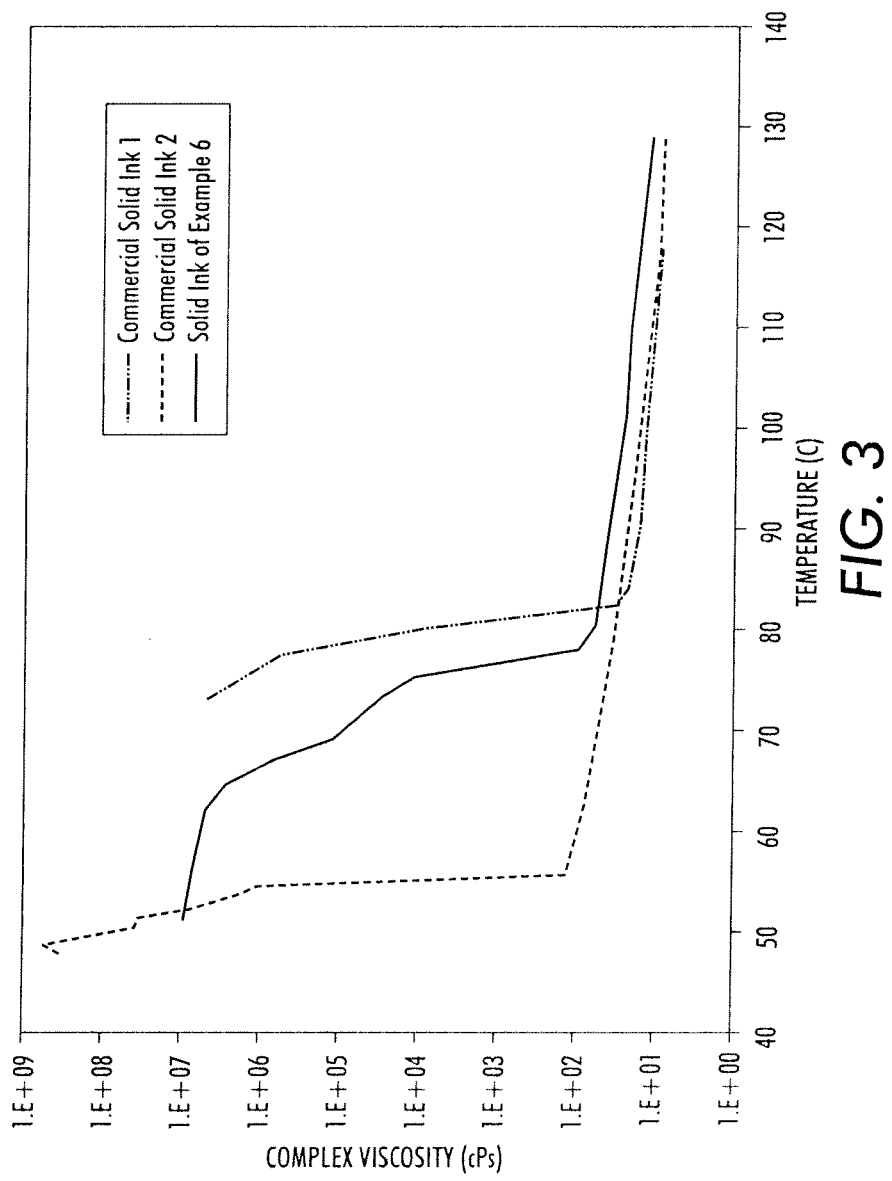
FIG. 3 is a graph illustrating rheological profiles (complex viscosity versus temperature) of an ink composition according to the present embodiments, compared to other known commercial phase change inks.

FIG. 3 illustrates the complex viscosity-temperature profile (complex viscosity versus temperature, at constant frequency rate of 1 Hz) of Ink Example 1 with its sharp phase-change transition, and compares it to known commercial solid inks, including those from Xerox Corp. FIG. 3 demonstrates that the ink of the present embodiments, comprising a semicrystalline oligomer resin, has satisfactory thermal and rheological properties in between those of the two commercially available inks, designated as Commercial Solid Ink 1 (from Xerox Corp.) and Commercial Solid Ink 2 (not from Xerox Corp.), but somewhat closer to the Xerox ink.

The ink of embodiments may further include conventional additives to take advantage of the known functionality associated with such conventional additives. Such additives may include, for example, at least one isocyanate derived functional material, antioxidant, defoamer, slip and leveling agents, clarifier, viscosity modifier, adhesive, plasticizer, dispersants, synergists and the like.

The ink vehicle or carrier may also include at least one isocyanate derived material. The isocyanate derived material may be a urethane compound obtained by reacting two equivalents of an alcohol, such as hydroabietyl alcohol and one or more equivalents of an isocyanate or diisocyanate (isophorone diisocyanate), as disclosed in, for example, Example 1 of U.S. Pat. No. 5,782,966, the disclosure of which is totally incorporated herein by reference in its entirety. Another example of an isocyanate-derived material is the urethane compound of Example 6, an example of a class of crystalline diurethane compounds disclosed in U.S. Pat. No. 7,560,587, which is hereby incorporated by reference in its entirety. Other suitable isocyanate-derived materials include a urethane compound that is the product of three equivalents of stearyl isocyanate reacted with a trifunctional alcohol such as glycerol, prepared as described in Example 4 of U.S. Pat. No. 6,309,453, the disclosure of which is totally incorporated herein by reference in its entirety. The isocyanate derived material may be present in the ink carrier at least about 2% by weight of the ink composition, such as for example from about 2 to about 70% by weight of the ink composition, from about 5 to about 65% of the ink composition, from abut 8 to about 60% by weight of the ink composition, and from about 10 to about 60% by weight of the ink composition. The ink may optionally contain antioxidants to protect the images from air or photo-oxidation and also may protect the ink components from oxidation while existing in the molten state in the ink reservoir. Examples of suitable antioxidants include, (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy)) ethoxyphenyl)propane (TOPANOL-205, available from ICI America Corporation), (3) tris(4-tert-butyl-3-hydroxy-2,6-dimethyl benzyl)isocyanurate (CYANOX 1790, 41, 322-4, LTDP, Aldrich D12, 840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #PO739), (7) tributylammonium hypophosphite (Aldrich 42, 009-3), (8) 2,6-di-tert-butyl-4-methoxyphenol (Aldrich 25, 106-2), (9) 2,4-di-tert-butyl-6-(4-methoxybenzyl)phenol (Aldrich 23, 008-1), (10) 4-bromo-2,6-dimethylphenol (Aldrich 34, 951-8), (11) 4-bromo-3,5-didimethylphenol (Aldrich B6, 420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich ID14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4, 680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26, 003-7), (21) α-trifluoro-o-creso-1 (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Adrich 29, 043-2), (26) 3-fluorophenylacetic acid (Aldrich 24, 804-5), (27) 3,5-difluoro phenylacetic acid (Aldrich 29, 044-0), (28) 2-fluorophenylacetic acid (Aldrich 20, 894-9), (29) 2,5-bis(trifluoromethyl)benzoic acid (Aldrich 32, 527-9), (30) ethyl-2-(4-(4-(trifluoromethyl)phenoxy)phenoxy) propionate (Aldrich 25, 074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43, 071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 0.5 percent to about 5 percent by weight of the ink.

The ink may further contain an optional tackifier such as the commercial derivatives of rosin acids derived from gum rosins or tall oil resins. Representative examples include, but are not limited to, a glycerol ester of hydrogenated abietic (rosin) acid such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Tackifiers may be present in the ink in any effective amount, such as from about 0.01 percent by weight of the ink to from about 30 percent by weight of the ink, from about 0.1 percent by weight of the ink to about 25 percent by weight of the ink, from about 1 weight percent of the ink to about 20 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 to about 30 percent, from about 0.1 to about 25 percent, from about 1 to about 20 percent by weight of the ink.

When present, the optional additives may each, or in combination, be present in the ink in any desired or effective amount, such as from about 0.1 to about 15 percent or from about 0.5 to about 12 percent by weight of the ink. In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink vehicle and is compatible with the other ink components. The phase change ink vehicle compositions can be used in combination with conventional colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Other suitable dyes include those disclosed in U.S. Patent Application Publication No. 2010/0086683 and U.S. Pat. Nos. 7,732,581; 7,381,831; 6,713,614; 6,646,111; 6,590,082; 6,472,523; 6,713,614; 6,958,406; 6,998,493; 7,211,131; and 7,294,730, each of which is incorporated herein by reference in its entirety. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

In embodiments, solvent dyes are employed. Examples of suitable solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

Pigments are also suitable colorants for the phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASE); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RE (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASE); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902$_7$, K6910 (commercially available from BASF); SUNFAST Magenta 122 (commercially available from Sun Chemical); HELIOGEN Blue D6840, D7080 (commercially available from BASF); Sudan Blue OS (commercially available from BASE); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASE); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASE); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASE); Suco-Yellow L1250 (commercially available from BASF); Suco-Yellow D1355 (commercially available from BASF); Suco Fast Yellow D1355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, U.S. Pat. No. 7,905,954; U.S. Pat. No. 7,503,973; U.S. Pat. No. 7,465,348, the disclosures of each of which are incorporated herein by reference in their entirety. The ink may also contain one or more dispersants and/or one or more surfactants for their known properties, such as for controlling wetting properties of the pigments in the ink composition. Examples of suitable additives that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); Foam Blast 20F, 30, 550 (Lubrizol); EFKA-1101, -4046, -4047, -2025, -2035, -2040, -2021, -3600, -3232; SOLSPERSE 13000, 13240, 17000, 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, 182 (BYK-Chemie); K-SPERSE 132, XD-A503, XD-A505 (King Industries).

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [CI. 61554] (BASF), Sudan Yellow 146 [CA. 12700] (BASF), Sudan Red 462 [C.I. 260501] (BASF), mixtures thereof and the like.

The colorant may be present in the phase change ink in any desired or effective amount to obtain the desired color or hue such as, for example, from about 0.5% to about 20% or from about 1% to about 15% by weight, or from about 2% to about 10% by weight of the ink composition. In embodiments, the ink vehicle for the phase change inks may have melting points of from about 50° C. to about 140° C., for example from about 60° C. to about 120° C., from about 65° C. to about 110° C., as determined by Differential Scanning calorimetry (DSC), or for example by visual observation and measurement on a microscope hot stage Furthermore, the phase change inks have a jetting viscosity of about 9 cPs to about 14 cPs, such as from about 10 cPs to about 13 cPs, from about 10.5 cPs to about 12 cPs, at ink melting points of about 100° C. to about 140° C.

The ink compositions can be prepared by any desired or suitable method. For example, each of the components of the ink carrier can be mixed together, followed by heating, the mixture to at least its melting point, for example from about 60° C. to about 150° C., 80° C. to about 120° C. and 85° C. to about 110° C. The colorant may be added before the ink ingredients have been heated or after the ink ingredients have been heated. When pigments are the selected colorants, the molten mixture may be subjected to grinding in an attritor or ball mill apparatus to effect dispersion of the pigment in the ink carrier. The heated mixture is then stirred for about 5 seconds to about 10 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in an apparatus for ink jet printing processes either directly to paper, or indirectly to an intermediate transfer member (such as offset printing). Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes, such as hot-melt lithographic, flexographic, and related offset ink printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, coated paper stocks and heavy paper stocks such as XEROX Digital Color Elite Gloss papers, transparency materials, fabrics, textile products, plastics, flexible polymeric films, inorganic substrates such as metals or silicon wafers, wood, and the like. The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Oligoesteramide Resin (Resin 1 in Table 1)

The oligoesteramide resin of this example is a representative example of a resin starting from 1,12-dodecanedioic acid and 6-aminohexanol as the monomers, and dodecanol (lauryl alcohol) as an end-capping agent, which was prepared as follows:

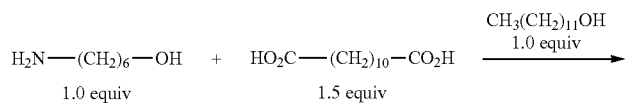

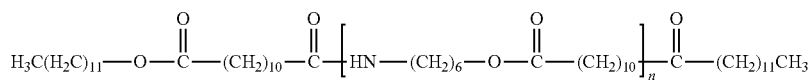

As shown above, 6-aminohexanol is reacted with 1,12-dodecanedioic acid with an end-capping agent of dodecanol or lauryl alcohol to produce the oligoesteramide. A 100 mL, 3-neck round bottom flask, fitted with an argon inlet, thermal probe connected to a digital temperature controller, magnetic stirring bar and short-path distillation head, was charged with: 1.172 g (10.0 mmol) of 6-aminohexanol (mp=55° C.) and 3.455 g (15 mmol) 1,12-dodecanedioic acid (mp=128° C.), and lastly with 1.863 g (10 mmol) of dodecanol (lauryl alcohol). The reaction mixture was heated with stirring at 400 rpm until molten (~100° C.). At this temperature, 4.2 mg (0.002 equiv.; 20.1 μmol) of FASCAT 4100 (n-BuSnO$_2$H, commercially available from Arkema) was added into the flask, and the reaction mixture was heated gradually up to 165° C., and heating was continued for 2 hr. Evolution of water vapor was noted at ~135° C., at which temperature all reagents were molten. After 2 hours, the temperature was increased to 180° C. for another 1 hr.

The reaction conversion was tracked by $^1$H-NMR and $^{13}$C-NMR analysis at 30, 45, 60, 90, 120 and 180 minute intervals. $^1$H-NMR analysis revealed that all of 6-aminohexanol had reacted by 180 min. High vacuum (<0.1 mmHg) was then applied for ~5 minutes to remove excess H$_2$O by-product trapped within the molten resin. The molten resin was poured neat into a tared beaker, affording 4.4 g yield of opaque, beige resin. Chemical structural composition of this product was confirmed by $^1$H-NMR spectroscopy.

Thermal analysis of the resin product by DSC, using a scan rate of 10° C./min over two consecutive heating and cooling cycles, indicated that the resin material had both crystalline and amorphous characteristics, since the thermal profile exhibited three distinct melt point transitions at 48° C., 64° C. and 90° C. (peak values) along with a glass transition (Tg) at an onset temperature of 26° C.

Rheological analysis performed over a temperature range of from 50° C. to 130° C. using a Rheometrics RFS3 instrument (oscillation frequency of 1 Hz, 25 mm parallel plate geometry, 200 applied strain %). A graphical plot of the complex viscosity—versus—temperature is shown in FIG. 1, which revealed that the material was semi-crystalline, with a sharp crystallization phase transition occurring at approximately 76° C., and a melt viscosity of ~50 cPs at 130° C.

Example 2

Preparation of Oligoesteramide Resin (Resin 2 in Table 2)

The oligoesteramide resin of this example was prepared in a similar procedure and at the same scale as Example 1 resin, except that p-methoxybenzyl alcohol (1.38 g, 10.0 mmol) was used in place of dodecanol as the end-capping agent. The reaction conversion was tracked by $^1$H-NMR and $^{13}$C-NMR for up to 3 hrs, after which time $^1$H-NMR analysis revealed that all of 6-aminohexanol had reacted. High vacuum (<0.1 mmHg) was applied for ~5 minutes to remove excess H$_2$O trapped within the mixture, which was subsequently poured into a container, affording 5.23 g yield of opaque, beige resin. Chemical composition of this product was confirmed by $^1$H-NMR spectroscopy. Rheological analysis performed over a temperature range of from 50° C. to 130° C. using a Rheometrics RFS3 instrument (oscillation frequency of 1 Hz, 25 mm parallel plate geometry, 200 applied strain %). A graphical plot of the complex viscosity—versus—temperature is shown in FIG. 1, which revealed that the material was semi-crystalline, with a sharp crystallization phase transition occurring at approximately 75° C., and a melt viscosity of ~74.5 cPs at 130° C.

Example 3

Preparation of Oligoesteramide Resin (Resin 3 in Table 1)

The oligo-esteramide resin of this example is a representative example of a resin starting from C36-Dimer Acid monomer, which was prepared as follows:

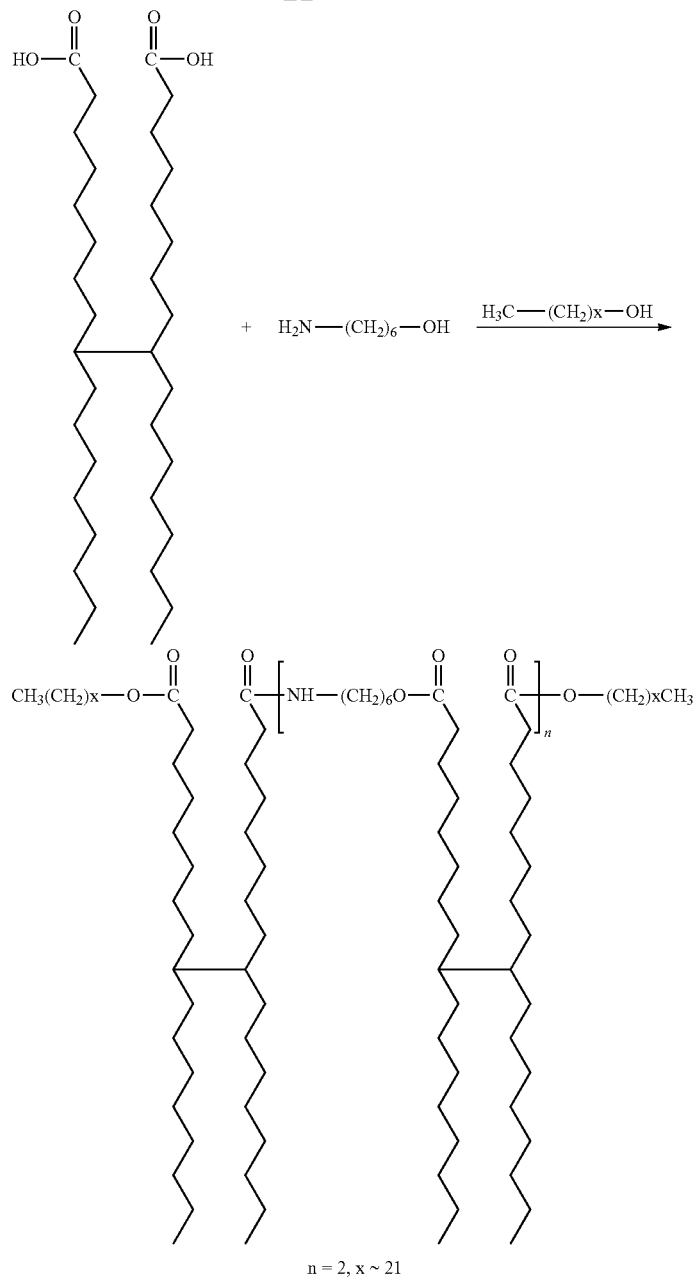

As shown above, PRIPOL 1006 (C-36 dimer diacid commercially available from CRODA Inc.) is reacted with 6-aminohexanol and with UNILIN 350 (x~21 carbon units, obtained commercially from Baker-Petrolite) as the end-capping agent to produce an oligoesteramide. In embodiments, the oligoesteramide resin structure was confirmed by NMR with n=2, and x~21 carbon units.

A 100 ml reaction kettle with a stir bar, a 4-necked lid equipped with a thermocouple connected to a digital temperature controller, an argon inlet and a short distillation head was charged with: 18.44 g (32 mmol) of Pripol 1006, a C-36 dimer diacid available from CRODA Inc., 2.52 g (22 mmol) of 6-aminohexanol available from Sigma Aldrich and 0.02 g (0.096 mmol) of FASCAT 4100 (n-BuSnO$_2$H; commercially available from Arkema. The reaction mixture was gradually heated with stirring to 180° C. and heating was continued for 4 hours, condensation was first observed at 130° C. Stopped heating and cooled the reaction mixture to 100° C. and added 8.91 g (24 mmol) of Unilin 350, a mono-carboxylic acid available from Baker Petrolite. The reaction mixture was gradually heated with stirring to 180° C. and kept at 180° C. for 3 hours during which more water was collected. Heating was stopped and the product was cooled to 120° C. and discharged in a tared aluminum tray to give 19.5 g of beige solid. $^1$H-NMR analysis confirmed the structure with n=2.

Example 4

Preparation of Oligoesteramide Resin (Resin 4 in Table 1)

The oligoesteramide resin of this example was prepared in a similar procedure and at the same scale as Example 1 resin, except that hexadecane-1-ol was used in place of dodecanol as the end-capping agent. Chemical composition of this product was confirmed by ¹H-NMR spectroscopy. Rheological analysis performed over a temperature range of from 50° C. to 130° C. using a Rheometrics RFS3 instrument (oscillation frequency of 1 Hz, 25 mm parallel plate geometry, 200 applied strain %) revealed that the material was semi-crystalline, with a sharp crystallization phase transition occurring at approximately 70° C., and a melt viscosity of ~26.5 cPs at 130° C.

Example 5

Preparation of Oligoesteramide Resin (Resin 5 in Table 1)

The oligoesteramide resin of this example was prepared in a similar procedure and at the same scale as Example 1 resin, except that terepthalic acid was used in place of 1,12-decanoic acid and 4-(methoxyphenyl)methanol was used in place of dodecanol as the end-capping agent. Chemical composition of this product was confirmed by ¹H-NMR spectroscopy. Rheological analysis performed over a temperature range of from 50° C. to 130° C. using a Rheometrics RFS3 instrument (oscillation frequency of 1 Hz, 25 mm parallel plate geometry, 200 applied strain %) revealed that the material was semi-crystalline, with a sharp crystallization phase transition occurring at approximately 76° C., and a melt viscosity of ~50 cPs at 130° C.

Example 6

Preparation of Oligoesteramide Resin (Resin 6 in Table 1)

The oligoesteramide resin of this example was prepared in a similar procedure and at the same scale as Example 1 resin, except that 10 mol % of 1,4-cyclohexanedicarbpxylic acid and 90 mol % of 1,12-decanoic acid was used in place of 100 mol % 1,12-decanoic acid and hexadecane-1-ol was used in place of dodecanol as the end-capping agent. Chemical composition of this product was confirmed by ¹H-NMR spectroscopy. Rheological analysis performed over a temperature range of from 50° C. to 130° C. using a Rheometrics RFS3 instrument (oscillation frequency of 1 Hz, 25 mm parallel plate geometry, 200 applied strain %) revealed that the material was semi-crystalline, with a sharp crystallization phase transition occurring at approximately 76° C., and a melt viscosity of ~50 cPs at 130° C.

Example 7

Preparation of Oligoesteramide Resin (Resin 7 in Table 1)

The oligoesteramide of this example was prepared using similar reagents as example 1 with the following changes in the reaction procedure: The reaction mixture re was heated gradually up to 160° C., and heating was continued for 1 hr. The temperature was increased to 180° C. and maintained at that temperature for 3 hrs. The temperature was reduced to 160° C. and high vacuum (<0.1 mmHg) was then applied for ~10 minutes to remove excess $H_2O$ by-product trapped within the molten resin. The molten resin was poured neat into a tared beaker. Chemical structural composition of this product was confirmed by ¹H-NMR spectroscopy.

Thermal analysis of the resin product by DSC, using a scan rate of 10° C./min over two consecutive heating and cooling cycles, indicated that the resin material had both crystalline and amorphous characteristics, since the thermal profile exhibited three distinct melt point transitions at 44° C., 59° C., 78° C. and 91° C. (peak values) along with a glass transition (Tg) at an onset temperature of 29° C.

Rheological analysis performed over a temperature range of from 50° C. to 140° C. using a Ares-G2 instrument (oscillation frequency of 1 Hz, 25 mm parallel plate geometry, 200 applied strain %). The rheological profile revealed that the material was semi-crystalline, with a sharp crystallization phase transition occurring at approximately 71° C., and a melt viscosity of ~31 cPs at 130° C.

Example 8

Preparation of Oligoesteramide Resin (Resin 8 in Table 1)

The oligoesteramide of this example was prepared in a similar procedure and at the same scale as Example 7 except that 2-phenylethanol was used in place dodecanol. Chemical structural composition of this product was confirmed by ¹H-NMR spectroscopy.

Rheological analysis performed over a temperature range of from 50° C. to 140° C. using a Ares-G2 instrument (oscillation frequency of 1 Hz, 25 mm parallel plate geometry, 200 applied strain %). The rheological profile revealed that the material was semi-crystalline, with a sharp crystallization phase transition occurring at approximately 73° C., and a melt viscosity of ~41 cPs at 130° C.

Example 9

Preparation of Phase Change Component (Compound 2 of Table 3)

The C-11 alkylated mono-oxazoline diol is a representative example of a suitable phase change component for the oligoesteramide semi-crystalline inks, was prepared as follows.

To a 1 Liter Parr reactor equipped with a double turbine agitator, and distillation apparatus, was charged with 200 grams of Lauric acid, 92 grams of tris (hydroxymethyl)aminomethane (a.k.a. TRIS-AMINO) and 0.45 grams of stannoic acid (Fascat 4100, available from Arkema Inc). The contents were heated to 165° C. for a 2 hour period, followed by increasing the temperature to 205° C. over a 2 hour period and wherein water was collected in the distillation receiver. The reactor pressure was then reduced to about 1-2 mm-Hg for one hour, followed by discharging the contents into a metal pan. The product was then dissolved by heating in a mixture of ethyl acetate (2.5 parts) and hexane (10 parts), and allowed to cool to room temperature whereby the pure product was obtained after filtration as a white crystalline powder. M.Pt. (by DSC): 99° C. (peak).

Example 10

Preparation of Phase Change Component (Compound 1 of Table 3)

Into a three-necked 200-mL round-bottom flask equipped with reflux condenser and pressure-equalized dropping funnel was added 1,3-bis(isocyanatomethyl)cyclohexane (1.32 g, 6.8 mmol; available from Aldrich Chemical Ltd., Milwaukee, USA); and anhydrous hexanes (30 mL) as the solvent. The mixture was stirred magnetically to give a homogeneous solution, referred to as 'solution A'. In a separate vessel, stearyl alcohol (3.68 g, 13.6 mmol; octadecanol, available from Aldrich Chemical Ltd.) was dissolved into 60 mL of a 1:1 mixture of anhydrous hexanes and anhydrous tetrahydrofuran (THF) solvents, until a clear solution was obtained (referred to as 'solution B'). To this solution B was added dibutyltin(IV) dilaurate as catalyst (86 mg), and the solution was transferred into the dropping funnel. Solution B was added slowly into the solution A while stirring at room temperature. When addition was completed, the entire mixture in the round-bottom flask was gradually heated to about 50° C. internal temperature, and kept heating at that temperature for about 90 min. After this time the reaction was completed (verified by $^1$H-NMR monitoring) and the product precipitate was observed as a suspension in the solvent mixture. About 10 mL of methanol was added to the mixture to ensure quenching of residual isocyanate reagent. The solvent was removed in vacuo and the precipitate was filtered, rinsing with cold hexanes, to provide 4.78 g (95.7% yield) of pure white powder product. The product composition was confirmed by $^1$H-NMR spectroscopy and elemental analysis (C,H,N).

Example 11

Preparation of Oligoester Resins (Resin 1 of Table 2)

The oligoester resin of this examples was prepared as follows:

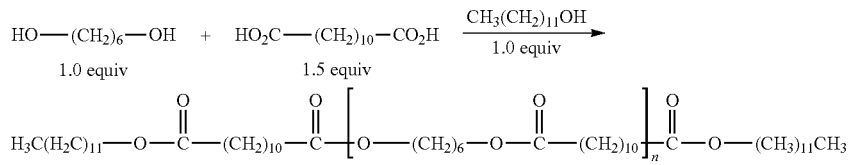

As shown above, Hexane-1,6-diol is reacted with 1,12-dodecanedioic acid with an end-capping agent of dodecanol or lauryl alcohol to produce the oligoester. A 100 mL, 3-neck round bottom flask, fitted with an argon inlet, thermal probe connected to a digital temperature controller, magnetic stirring bar and short-path distillation head, was charged with: 3.55 g (30.0 mmol) of Hexane-1,6-diol and 10.36 g (45 mmol) 1,12-dodecanedioic acid and lastly with 5.59 g (30 mmol) of dodecanol (lauryl alcohol). The reaction mixture was heated with stirring at 400 rpm until molten (~100° C.). At this temperature, 0.013 mg (0.06 mmol) of FASCAT 4100 (n-BuSnO$_2$H, commercially available from Arkema) was added into the flask, and the reaction mixture was heated gradually up to 160° C., and heating was continued for 1 hr. Evolution of water vapor was noted at ~135° C., at which temperature all reagents were molten. After 1 hours, the temperature was increased to 185° C. for another 3.5 hrs.

The molten resin was cooled to 160° C. and poured neat into a tared beaker, affording 14.5 g yield of opaque, beige resin. Chemical structural composition of this product was confirmed by $^1$H-NMR spectroscopy.

Rheological analysis performed over a temperature range of from 50° C. to 140° C. using a Ares-G2 instrument (oscillation frequency of 1 Hz, 25 mm parallel plate geometry, 200 applied strain %). The rheological profile revealed that the material was semi-crystalline, with a sharp crystallization phase transition occurring at approximately 51° C., and a melt viscosity of ~11.3 cPs at 140° C.

Example 12

Preparation of Oligoester Resins (Resin 2 of Table 2)

As shown below, Hexane-1,6-diol is reacted with 1,12-dodecanedioic acid:

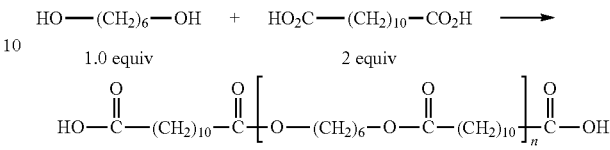

A 100 mL, 3-neck round bottom flask, fitted with an argon inlet, thermal probe connected to a digital temperature controller, magnetic stirring bar and short-path distillation head, was charged with: 4.0 g (33.8 mmol) of Hexane-1,6-diol and 15.59 g (67.7 mmol) 1,12-dodecanedioic acid. The reaction mixture was heated with stirring at 400 rpm until molten (~140° C.). At this temperature, 0.014 mg (0.068 mmol) of FASCAT 4100 (n-BuSnO$_2$H, commercially available from Arkema) was added into the flask, and the reaction mixture was heated gradually up to 160° C., and heating was continued for 1 hr. After 1 hour, the temperature was increased to 185° C. for another 4.5 hrs.

The molten resin was cooled to 160° C. and poured neat into a tared beaker, affording 16.9 g yield of opaque, beige resin. Chemical structural composition of this product was confirmed by $^1$H-NMR spectroscopy.

Thermal analysis of the resin product by DSC, using a scan rate of 10° C./min over two consecutive heating and cooling cycles, indicated that the resin material had both crystalline and amorphous characteristics, since the thermal profile exhibited three distinct melt point transitions at 78° C. and 106° C. (peak values) along with a glass transition (Tg) at an onset temperature of 42° C.

Rheological analysis performed over a temperature range of from 50° C. to 140° C. using a Ares-G2 instrument (oscillation frequency of 1 Hz, 25 mm parallel plate geometry, 200 applied strain %). The rheological profile revealed that the material was semi-crystalline, with a sharp crystallization phase transition occurring at approximately 83° C., and a melt viscosity of ~16.5 cPs at 140° C.

Example 13

Preparation of Solid Ink Composition (Ink Example 1 of Table 4)

As a representative example, a solid ink comprised of the semi-crystalline oligoesteramide resins (Example 1 and 2 resins in Table 1) and a crystalline phase change component (Example 2 in table 3, phase change component), was prepared in the following manner.

The following components were added into a 60 mL amber glass beaker in the following order: 1) Oligo-esteramide resin of Example 1 resin (1.61 g, or 16 wt % of ink); 2) oligo-esteramide resin of Example 2 (1.23 g, or 12.3 wt % of ink); recrystallized C11-alkylated mono-oxazoline diol of Example 2 in table 3 (6.40 g, or 64.0 wt % of ink); 3) viscosity modifier S-180 (0.44 g, or 4.4 wt % of ink; available commercially as Kemamide or stearyl stearamide); 4) Orasol Blue GN dye (0.3 g, or 3 wt % of ink; available from Ciba Geigy); and 5) Naugard 445 antioxidant (0.02 g, or 0.2 wt % of ink). The ink components were mixed together while molten at 130° C. using magnetic stirring at 350 rpm for at least 1 hour before pouring into a mold and cooled to a solid ink.

The ink had uniform blue appearance throughout the sample, and viscosity at 130° C. was 12.5 cPs as determined on an RFS3 strain-controlled rheometer (frequency rate=1 Hz; using 25 mm parallel plate geometry), and had onset temperature of crystallization at 82° C. (determined by rheology), and a narrow liquid-to-solid phase transition that spanned from 85 to 75° C. (about 10° C. range).

Example 14

Preparation of Solid Ink Composition (Ink Example 2 of Table 4)

A solid ink comprised of the semi-crystalline oligoesteramide resin and a crystalline phase change component indicated in Table 4 was prepared according to the same method as used in Example 9 for Ink Example 1.

Example 15

Preparation of Solid Ink Composition (Ink Example 3 of Table 4)

A solid ink comprised of the semi-crystalline oligoesteramide resin and a crystalline phase change component indicated in Table 4 was prepared according to the same method as used in Example 9 for Ink Example 1.

Example 16

Preparation of Solid Ink Composition (Ink Example 4 of Table 4)

A solid ink comprised of the semi-crystalline oligoesteramide resin and a viscosity modifier indicated in Table 4 was prepared according to the same method as used in Example 9 for Ink Example 1.

Example 17

Preparation of Solid Ink Composition (Ink Example 5 of Table 4)

A solid ink comprised of the semi-crystalline oligoester resin and a crystalline phase change component indicated in Table 4 was prepared according to the same method as used in Example 9 for Ink Example 1.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A solid phase change ink comprising:
 a semi-crystalline oligomer resin selected from the group consisting of a polyester, an oligoester, a polyesteramide and oligoesteramide;
 an optional colorant; and
 an ink vehicle, wherein the semi-crystalline oligomer resin is made from a condensation reaction of a dicarboxylic acid or anhydride or diester, a difunctional alkanol monomer, and an optional monofunctional end-capping reactant, and further wherein the oligomer resin is an oligoesteramide and has the following formula

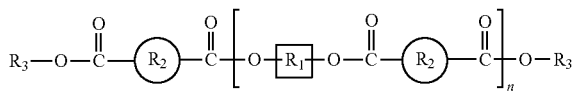

wherein $R_1$, $R_2$, and $R_3$ are independent from one another and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10.

2. The solid phase change ink of claim 1, wherein the ink vehicle has a crystallization temperature that lies within ±15° C. of the crystallization temperature of the oligomer resin.

3. The solid phase change ink of claim 1, wherein said ink has a melt temperature of 80° C. or higher.

4. The solid phase change ink of claim 3, wherein said ink has a melt temperature of from about 80 to about 130° C.

5. The solid phase change ink of claim 1, wherein said ink has a crystallization of from about 50 to about 110° C.

6. The solid phase change ink of claim 5, wherein said ink has a crystallization of from about 60 to about 100° C.

7. The solid phase change ink of claim 1, wherein said ink has a viscosity of greater than $1 \times 10^6$ cPs over a temperature range of from about 20° C. to about 60° C.

8. The solid phase change ink of claim 1, wherein the ink vehicle further comprises other crystalline components present in an amount of 1 to 70 wt % of the ink.

9. The solid phase change ink of claim 1 having a phase-transition from liquid (molten) state to solid (crystallized) state at a temperature ranging from about 50° C. to about 110° C.

10. The solid phase change ink of claim 1 having an ink crystallization phase transition from liquid state to solid state that ranges in temperature of from about 5° C. to about 15° C.

11. A solid phase change ink comprising:
 a semi-crystalline oligomer resin selected from the group consisting of a polyester, an oligoester, a polyesteramide and oligoesteramide;

a colorant; and an ink vehicle, wherein the oligomer resin is made by the condensation reactions of a dicarboxylic acid, a difunctional alkanol monomer, and an optional monofunctional end-capping reactant, represented by the following reaction:

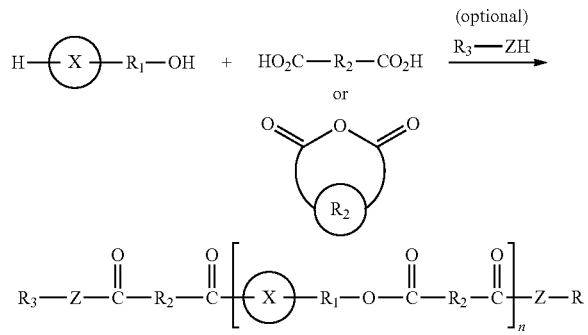

wherein X=O, NH, and mixtures thereof, group Z=O or NH in the optional end-capping agent $R_3ZH$, and $R_1$, $R_2$, and $R_3$ are independent from one another and are unsubstituted and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10; further wherein the ink vehicle comprises a crystalline compound.

12. The solid phase change ink of claim 11, wherein a mol percent ratio of the dicarboxylic acid to the difunctional alkanol monomer is from about 2:1 to about 0.5:1.

13. A solid phase change ink comprising:

A semi-crystalline oligoesteramide or oligoester resin;

a colorant; and an ink vehicle, wherein the oligoesteramide resin has the following formula

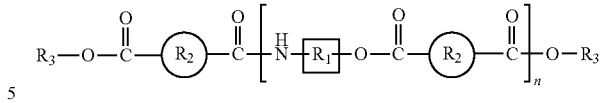

wherein $R_1$, $R_2$, and $R_3$ are independent from one another and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10, and the oligoester resin has the following formula

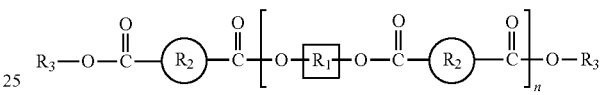

wherein $R_1$, $R_2$, and $R_3$ are independent from one another and further wherein $R_1$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_2$ is an alkylene group having from about 1 to about 20 carbons; alkyleneoxy having from about 1 to about 20 carbons; arylene group having from about 6 to about 20 carbons; or arylalkylene group having from about 7 to about 20 carbons; $R_3$ is H; alkyl group having from about 1 to about 50 carbons; aryl group having from about 6 to about 50 carbon atoms or alkylaryl group having from about 7 to about 50 carbons; and n is a number of from about 1 to about 10; further wherein the ink vehicle comprises a crystalline compound.

14. The solid phase change ink of claim 13, wherein the oligoesteramide or oligoester resin is present in an amount of from about 10 to about 90 percent by weight of the total weight of the solid phase change ink.

* * * * *